3,355,300
DRY ICE CREAM MIX COMPOSITION AND A METHOD FOR PRODUCING SAME

Araxia B. Avedikian and Souren Zacharia Avedikian, both of 34 Athens Road, Short Hills, N.J. 07078
No Drawing. Filed May 20, 1963, Ser. No. 281,781
2 Claims. (Cl. 99—136)

This invention relates to a dry composition of matter, an ice cream mix, and to a method of producing the same. The product is free flowing, in essentially powdered form. The product may also be in the form of free flowing "beads" like those of "instantly soluble" dry milk solids. Upon being dispersed in cold water and agitated at high speed, for example in a household mixer at the speed of whipping cream, this product forms a creamy suspension which upon freezing has the physical and organoleptic properties of ice cream.

Powdered ice cream compositions consisting generally of dried milk solids, stabilizers and emulsifying agents are well known. However, these powdered ice cream compositions have to be mixed with dairy fats, such as butter or cream, in order to produce ice creams that will meet with the requirements of the definition for ice cream established by the Food & Drug Administration and the several states, and to have the physical and taste properties associated wth this popular dessert. Furthermore, these compositions have to be processed in very special ways to produce an ice cream which will have the desirable properties of smoothness and creaminess and will not contain hard particles of ice.

Powdered fat compositions comprising fats and emulsifying agents, proteinaceous materials and other compositions capable of being whipped into toppings and cake frostings are also well known. To attain suitable overrun and suitable properties, these fat compositions are usually prepared by drying emulsions of the fat and the emulsifying agent containing the various stabilizing and encapsulating solids. However, the frozen end-products of such powdered fat compositions, after whipping, have the appearance and texture of frozen whipped cream and not the body, creaminess and melting properties of ice cream.

It is, therefore, an object of the present invention to provide a dry ice cream mix composition which upon admixture with cold water and rapid agitation will yield a whipped, emulsified mixture of adequate overrun which upon freezing will yield a product having the physical appearance of normal ice cream, and will have the taste sensation and melting properties of normal ice cream in the mouth when eaten by the consumer.

Another object of this invention is to provide a dry ice cream mix composition which, although satisfying the requirements of the consumer as far as ice cream properties are concerned, furnishes less than one-half of the caloric value of normal ice cream.

Furthermore, this unique product by saving freezer space both in the store and in the home offers distinct advantages and economies.

Another specific object of this invention is to produce a dry ice cream composition which by its very nature of being dry can be stored on the shelf at room temperature for long periods of time without deterioration; in package form, it occupies little space since it does not contain the liquids and air normally present in ice cream; is readily available for making ice cream by merely mixing with water, whipping and freezing in a suitable container; and which by virtue of its unique composition, and with only one beating and no special reprocessing, produces a product which freezes to a creamy texture without hard ice crystals and is as organoleptically acceptable to the consumer as normal ice cream.

These and other objects of our invention will become apparent in the descriptions which follow.

A dry ice cream mix composition is capable of being made into ice cream when the ice cream mix is prepared as described below.

In the preferred embodiment of our invention, in preparing this ice cream composition in a final, dry free-flowing essentially powder form, we use the ingredients in about the following proportions—namely, 4 kilograms of sugar, 4 kilograms of corn hydrolyzate (corn sweetener) 150 grams of food grades of "Methocel" or carboxymethyl cellulose, 496 grams of a vegetable oil, a blend of vegetable oils, a fat or a blend of such fats and oils stabilized by well-known methods against oxidative deterioration, 303 grams of an emulsifying agent composition comprising the following individual substances—27 grams of a polyoxyethylene sorbitan monostearate, 83 grams of a polyoxyethylene sorbitan tristearate, 28 grams of a polyoxyethylene sorbitan monooleate and 165 grams of a propylene glycol fatty acid derivative of which 45% is the monostearate derivative and 55% is the palmitate derivative, 7.8 kilograms of non-fat milk solids, instantly soluble, as prepared by well-known methods, and 100 grams of the desired flavoring agent, such as a composition containing vanilla or its equivalent.

When about 170 grams of the above indicated mixture is uniformly dispersed in about 270 grams of water and agitated at high speed, for example the speed at which cream is usually whipped, by means of an egg beater type of mixer, preferably electric, in a suitable bowl, e.g., 6 inches deep by 5¼ inches in diameter, a smooth, creamy product is obtained. The finished volume is about one quart and shows an overrun of about 100%, the initial volume being about 16 fluid ounces. This creamy product is frozen in, preferably, a metal ice tray or other suitable container by placing it in the freezer compartment of a refrigerator. The frozen product is a smooth, creamy ice cream which is ready to serve in two to four hours depending on the temperature of the freezer. At a freezer temperature of 20° F., and in a tray 5 inches by 10 inches by 1 inch deep the product is ready in two hours but becomes harder if left in the freezer for a longer period of time. When this operation is carried out at a speed of about 500 r.p.m., the speed at which cream would usually be whipped, the desired creamy consistency and overrun of 100% is obtained in about 10 minutes. At lower speeds it takes longer to achieve the proper dispersion of the ingredients and the desired overrun. These are given by way of illustration only.

We have found that these results are obtainable if the following procedure is followed in preparing the dry ice cream mix. The oils and the emulsifying agents are heated until they are homogeneous or blend thoroughly into a uniform mixture (hereinafter referred to as "fats") and are sufficiently fluid to pour. A temperature of 100° F. has been found suitable. This temperature is merely illustrative. The sugars, corn hydrolyzates and one-half of the "Methocel" or the carboxymethyl cellulose are blended into a uniform, dry mixture. This mixture (hereinafter referred to as "sugars") is added to the "fats" while the "fats" are still warm and, hence, liquid enough to coat all particles of the "sugars" when the mass is subjected to continuous attrition. This operation is carried out in any suitable apparatus, for example a "mortar and pestle." This is similar to the "creaming of sugar with shortening or butter" as practiced in cooking, and the operation is continued until the composition becomes uniform in consistency and appearance with each discrete particle properly coated.

This well-mixed composition of "fats" and "sugars" is then mixed with the non-fat milk solids, flavoring agent and the other half of the "Methocel" or the carboxymethyl cellulose. These may be previously mixed together or they may be added individually. We found that when this mixing is carried out in this manner, so as to obtain a thoroughly uniform end-product, this end-product is a dry, free-flowing, essentially powdery composition which has good keeping qualities and is stable in storage.

This is the dry ice cream mix composition of our invention.

The "sugars" used in the amount of 8.15 kilograms (18.6%) in the preferred embodiment of our invention comprise the following.

(a) Sucrose (e.g. cane sugar), 4 kilograms (9.13%), functions as the primary sweetening agent. We have found that we can substitute a portion of this with artificial, non-nutritive sweetening agents such as calcium or sodium cyclamate and/or saccharin. The amount of cyclamate required is in the ratio of 1 part of cyclamate to 20 or 30 parts of the sucrose. In the case of saccharin, the ratio is 1 part of saccharin to about 300 parts of the sucrose. As indicated in Example 3, the sucrose may also be completely substituted by the cyclamate or saccharin.

(b) Corn hydrolyzate, 4 kilograms (9.13%), functions as a secondary sweetening agent, and also acts as a bodying agent and assists in the freezing and thawing processes of our ice cream. The corn hydrolyzate is in the form of a dry powder and is made from corn syrup by evaporation of the water. The corn hydrolyzate is a mixture of polysaccharides. It may contain a small percentage of unhydrolyzed cornstarch.

(c) "Methocel," 150 grams (0.34%), functions as a protective agent and a coupling agent which makes possible the uniform dispersion of the "fats" into the aqueous phase when our dry ice cream mix is beaten with cold water. It helps to produce the creamy texture and to maintain this texture all through the freezing operation by coupling with the "Methocel" which is added as part of the non-fat milk solids. It protects the colloidal structure.

Instead of using "Methocel," we may also use sodium carboxymethyl cellulose (CMC of commerce) or natural gums, such as guar, sodium alginate, carragheen (Irish moss extract), and the like. The proportions of the natural gums may be varied to give the desired consistency to the ice cream upon whipping, and to impart to the final product more organoleptically acceptable properties. We may use any of the above-named materials singly or in different combinations thereof, as will become apparent in the examples given below.

By varying the proportions of these ingredients, different appearance of ice cream structure, gel-like properties, more rapid or slower melting characteristics have been obtained.

The "fats" used in the amount of 799 grams (1.82%), comprise 496 grams (1.13%) of a blend of vegetable oils, preferably bland and neutral in tase and flavor. We prefer to use oils (fatty acid glycerides) which have a high percentage of polyunsaturates and are vegetable in origin, although, glycerides of animal origin and low in polyunsaturates or even of wholly saturated fatty acids have also functioned well. In the preferred embodiment of our invention, we use vegetable oils which are the glycerides of fatty acids which have iodine numbers in the range of 109 to 145.

The emulsifying agents used in the amount of 303 grams (0.69%) comprise complex mixtures of polyoxyethylene ethers of mixed partial fatty acid esters of sorbitol anhydrides. For example, we use polyoxyethylene 20 sorbitan monostearate, tristearate, and monooleate. We also supplement these with the mono ester of propylene glycol in which the fatty acid could be any fatty acid but preferably is palmitic or stearic or any combination thereof. In the preferred embodiment of our invention, the ratio of palmitic to stearic acid is 55% to 45%, for example, we use a product of Drew Chemical Corporation identified as PGMC-45S.

The non-fat milk solids used in the amount of 7.8 kilograms (17.82%) comprise the dried product obtained preferably from spray drying of skimmed milk produced by any of the well-known methods. Such a product is commonly known as instantly soluble and usually occurs in well-known bead form. Non-fat milk solids produced by other methods of drying and available in powder form are also suitable for use in our ice cream mix composition. The non-fat milk solids constitute the major portion of our dry ice cream mix and are also the main source of protein in our ice cream mix composition.

As a secondary source of protein, we have found gelatin to function as a protective as well as a bodying agent, especially when in a very finely powdered form known as "gelatin flour."

The basic flavoring agents used in the amount of 100 grams (0.23%), or more, comprise approximately 20 grams of artificial vanilla such as vanillin and/or its derivatives, 70 grams of natural vanilla compounds, and 10 grams of an artificial butter flavoring. The latter comprises a composition containing diacetyl, butyric acid, ethyl butyrate and vanillin in suitable proportions to yield a flavor that will be similar to that of butter and will be organoleptically acceptable. In addition, for the preparation of a coffee flavored ice cream, we use 400 grams of a soluble coffee. For the preparation of our ice cream composition with different flavors, we use adequate amounts flavoring agent, such as chocolate, strawberry, peach, almond, maple walnut, etc. in which the amount is usually less than 500 grams, and which is usually superimposed on the basic vanilla flavor.

Although we prefer to use a small percentage of a fat or an oil, or blends thereof, and an emulsifying agent based on a fatty acid, as described above in the preferred embodiment of our invention, we have also found that we can omit the "fats" in order to produce an even lower calorie product.

Following are specific examples of dry ice cream mix compositions each of which, when dispersed in cold water, whipped and frozen at a temperature of about 20° F. as hereinabove described, produces an ice cream that is smooth and is organoleptically acceptable to the consumer as this popular dessert.

EXAMPLE 1 (63–164)

| Ingredients | Percent parts by weight | |
|---|---|---|
| | In the dry mix | In the final Ice cream product |
| Non-fat milk solids | 46.26 | 17.82 |
| Sucrose (cane sugar) | 23.75 | 9.13 |
| Corn hydrolyzate | 23.75 | 9.13 |
| "Methocel" (high viscosity) | 0.89 | 0.33 |
| Soybean oil, specially processed [1] | 2.95 | 1.13 |
| Polyoxyethylene 20 sorbitan monostearate | 0.16 | 0.06 |
| Polyoxyethylene 20 sorbitan tristearate | 0.49 | 0.19 |
| Polyoxyethylene 20 sorbitan monooleate | 0.17 | 0.06 |
| PGMS-45S | 0.98 | 0.38 |
| Flavoring (vanilla type) | 0.60 | 0.2₸ |
| Cold water | | 61.53 |

[1] Stabilized against oxidative deterioration by addition of butylated hydroxytoluene, butylated hydroxyanisole, and methyl silicone.

This dry ice cream mix is prepared in the manner described above under the preferred embodiment of our invention. The ice cream prepared from this dry ice cream composition will furnish about 20 calories per fluid ounce.

EXAMPLE 2 (63-94)

| Ingredients | Percent parts by weight | |
|---|---|---|
| | In the dry mix | In the final Ice cream product |
| Non-fat milk solids | 36.09 | 12.54 |
| Sucrose (cane sugar) | 24.06 | 8.36 |
| Corn hydrolyzate | 24.06 | 8.36 |
| "Methocel" (high viscosity) | 2.05 | 0.71 |
| Corn oil [1] | 10.05 | 3.53 |
| Polysorbate 60 | 0.17 | 0.06 |
| Polysorbate 80 | 0.17 | 0.06 |
| PGMS-45S | 1.72 | 0.60 |
| Glyceryl monostearate | 1.03 | 0.36 |
| Flavoring (vanilla type) | 0.60 | 0.21 |
| Cold water | | 65.21 |

[1] Stabilized against oxidative deterioration by addition of butylated hydroxytoluene, butylated hydroxyanisole, and methyl silicone.

EXAMPLE 3 (63-123)

| Ingredients | Percent parts by weight | |
|---|---|---|
| | In the dry mix | In the final Ice cream product |
| Non-fat milk solids | 57.74 | 18.22 |
| Cyclamate | 1.44 | 0.46 |
| Saccharin | 0.07 | 0.02 |
| Corn hydrolyzate | 28.90 | 9.11 |
| "Methocel" (high viscosity) | 1.95 | 0.62 |
| Soybean oil [1] | 5.30 | 1.67 |
| Polysorbate 60 | 0.48 | 0.15 |
| Polysorbate 65 | 0.72 | 0.22 |
| Polysorbate 80 | 0.96 | 0.30 |
| PGMS-45S | 1.93 | 0.61 |
| Flavoring (vanilla type) | 0.51 | 0.22 |
| Cold water | | 68.40 |

[1] Stabilized against oxidative deterioration by addition of butylated hydroxytoluene, butylated hydroxyanisole, and methyl silicone.

EXAMPLE 4 (63-129)

| Ingredients | Percent parts by weight | |
|---|---|---|
| | In the dry mix | In the final Ice cream product |
| Non-fat milk solids | 45.15 | 16.62 |
| Sucrose (cane sugar) | 4.52 | 1.66 |
| Cyclamate | 1.12 | 0.41 |
| Corn hydrolyzate | 38.50 | 14.18 |
| CMC (high viscosity) | 1.74 | 0.64 |
| Soybean oil [1] | 4.52 | 1.66 |
| Polysorbate 60 | 0.45 | 0.17 |
| Polysorbate 65 | 0.45 | 0.17 |
| Polysorbate 80 | 0.23 | 0.09 |
| PGMS-45S | 2.70 | 1.00 |
| Flavoring (vanilla type) | 0.62 | 0.23 |
| Cold water | | 63.17 |

[1] Stabilized against oxidative deterioration by addition of butylated hydroxytoluene, butylated hydroxyanisole, and methyl silicone.

EXAMPLE 5 (63-147)

| Ingredients | Percent parts by weight | |
|---|---|---|
| | In the dry mix | In the final Ice cream product |
| Non-fat milk solids | 42.74 | 17.20 |
| Sucrose (cane sugar) | 22.43 | 9.04 |
| Corn hydrolyzate | 22.43 | 9.04 |
| "Methocel" (high viscosity) | 2.72 | 1.10 |
| Cocoanut oil [1] (partially hydrogenated) | 5.02 | 2.02 |
| Polysorbate 60 | 0.70 | 0.28 |
| Polysorbate 65 | 0.70 | 0.28 |
| Polysorbate 80 | 0.21 | 0.09 |
| PGMS-45S | 2.24 | 0.90 |
| Flavoring (vanilla type) | 0.81 | 0.32 |
| Cold water | | 59.73 |

[1] Stabilized against oxidative deterioration by addition of butylated hydroxytoluene, butylated hydroxyanisole, and methyl silicone.

The dry ice cream mix in each of the examples given above is prepared in the manner described above under the preferred embodiment of our invention. The ice cream prepared from the dry ice cream mixes of Examples 1, 2, 3, 4 and 5 will furnish about 20, 22, 20, 20 and 23 calories per ounce, respectively.

EXAMPLE 6 (63-54)

| Ingredients | Percent parts by weight | |
|---|---|---|
| | In the dry mix | In the final Ice cream product |
| Non-fat milk solids | 40.45 | 16.60 |
| Sucrose (cane sugar) | 32.35 | 13.28 |
| Corn hydrolyzate | 20.22 | 8.30 |
| "Methocel" (high viscosity) | 0.96 | 0.39 |
| Natural gums (guar, alginate and carragheen) | 0.96 | 0.39 |
| Gelatin flour | 1.92 | 0.79 |
| Flavoring (vanilla type) | 0.10 | 0.04 |
| Flavoring (coffee, soluble) | 3.04 | 1.25 |
| Cold water | | 58.96 |

EXAMPLE 7 (62-42)

| Ingredients | Percent parts by weight | |
|---|---|---|
| | In the dry mix | In the final Ice cream product |
| Non-fat milk solids | 53.45 | 20.95 |
| Sucrose (cane sugar) | 30.55 | 11.98 |
| Corn hydrolyzate | 12.85 | 5.06 |
| "Methocel" (high viscosity) | 0.52 | 0.21 |
| Natural gums (guar, alginate and carragheen) | 0.76 | 0.30 |
| CMC (high viscosity) | 0.48 | 0.19 |
| Gelatin flour | 1.29 | 0.51 |
| Flavoring (vanilla type) | 0.10 | 0.04 |
| Cold water | | 60.76 |

In Examples 6 and 7, all of the dry ingredients are blended into a uniform mixture. These dry mixes, when dispersed in cold water, whipped and frozen, produce a smooth product that furnishes to the consumer the enjoyment and acceptance associated with ice cream. Although sucrose (cane sugar) has been listed as the sweetening agent in Examples 6 and 7, calcium and sodium cyclamate, and saccharin may also be used in the ratio of 1 part of cyclamate to 30 parts of sucrose and/or 1 part of saccharin to 300 parts of sucrose. The proportions of cyclamate and saccharin may be varied, or only one or the other may be used with sucrose consistent with the degree of sweetness desired and organoleptically acceptable properties of the finished ice cream mix.

The preferred embodiment cites a specific ingredient or a combination of ingredients for each class of materials used in the preparation of our dry ice cream mix. It is not intended to limit the scope of this invention to the use of the items listed, but it is desired to include equivalents which would function in a manner consistent with securing the desired composition of matter, namely, a free-flowing ice cream mix essentially in powder form which upon being dispersed in cold water and agitated at high speed forms a creamy suspension having a volume approximately 100% larger than the volume at the start, and which after being frozen presents the physical and organoleptic properties of ice cream. For example, instead of the high viscosity "Methocel," CMC mentioned above, we may use lower viscosity grades. Vegetable oils such as cottonseed, peanut and cocoanut oils (partially or fully hydrogenated), oleomargarine, and butter have been used as the fat-furnishing material of our dry ice cream mix. Further, in lieu of the cold water used in the examples, we may use cold whole milk, cold milk and cream, cold water and cream, etc. Also the quantities or parts by weight given in the examples are by way of illustration and are not limiting.

We are aware that prior to our invention various compositions have been offered for the preparation of ice cream or ice cream like products, but none are known which produce these products without requiring reprocessing. Such reprocessing may involve an initial fast freeze of short duration, usually about 30 minutes, after the first whipping. This is then followed by a second mixing or whipping followed by the final freezing operation. As an alternative, the mixture may be whipped continuously during the entire period of ice cream preparation, such as has been practiced in home freezers in the past.

What is claimed is:

1. A process for preparing a dry composition of matter, an ice cream mix, which comprises the blending of an oil of vegetable origin selected from the group consisting of corn oil, cottonseed oil, peanut oil, soybean oil, and coconut oil, the total amount of the oil constituting about 2.95 to 10.05 percent, with suitable emulsifying agents selected from the group consisting of polyoxyethylene sorbitan monostearate, polyoxyethylene sorbitan tristearate, polyoxyethylene sorbitan monooleate, a monostearate derivative of propylene glycol fatty acid, and a palmitate derivative of propylene glycol fatty acid, the total amount of emulsifying agents being from about 1.8 to 4.09 percent, heating such blend to make it fluid enough to pour, contacting this fluidized mixture with powdered materials consisting of corn hydrolyzate as a secondary sweetening agent and a bodying agent together with primary sweetening agents selected from the group consisting of sucrose, cyclamate, and saccharin, the corn hydrolyzate constituting from about 12 to 39 percent and the sucrose constituting from 22 to 30 percent when used as the principal sweetener, protective agents selected from the group consisting of methyl cellulose, sodium carboxymethyl cellulose, and natural gums, wherein intimate contact is brought about between the fluidized mixture and the powdery solid particles by pressure and friction, until the mass becomes an essentially uniform powdery mixture both in consistency and in appearance, and then mixing this with about 36 to 57 percent of non-fat milk solids and with flavoring materials and additional protective agents, all percentages herein being by weight in the dry mixture.

2. The process described in claim 1 wherein said oil of vegetable origin contains an agent to protect it against oxidative deterioration, the protective agent being selected from the group consisting of hydroxytoluene, butylated hydroxyanisole, and methyl silicone.

References Cited

UNITED STATES PATENTS

| | | | |
|---|---|---|---|
| 2,431,704 | 12/1947 | Musher | 99—136 |
| 2,445,226 | 7/1948 | Landers | 99—136 X |
| 2,587,369 | 2/1952 | Nash | 99—136 |
| 2,679,458 | 5/1954 | Katz | 99—136 |
| 2,821,480 | 1/1958 | Hilker | 99—136 |
| 2,823,129 | 2/1958 | Steinitz | 99—136 |
| 2,876,104 | 3/1959 | Blindzius et al. | 99—136 |
| 3,003,882 | 10/1961 | Peat | 99—136 |

OTHER REFERENCES

Sommer, Hugo H., "The Theory and Practice of Ice Cream Making," 6th Ed., 1951, p. 436.

A. LOUIS MONACELL, *Primary Examiner.*

R. AULL, J. M. HUNTER, *Assistant Examiners.*